United States Patent
Jorgensen et al.

(10) Patent No.: US 10,975,585 B2
(45) Date of Patent: Apr. 13, 2021

(54) CONNECTION ASSEMBLY FOR FORMWORK

(71) Applicant: PERI Formwork Systems, Inc., Elkridge, MD (US)

(72) Inventors: David L. Jorgensen, Jacksonville Beach, FL (US); Mark D. Henning, La Grange, IL (US)

(73) Assignee: PERI Formwork Systems, Inc., Elkridge, MD (US)

( * ) Notice: Subject to any disclaimer, the term of this patent is extended or adjusted under 35 U.S.C. 154(b) by 84 days.

(21) Appl. No.: 16/160,898

(22) Filed: Oct. 15, 2018

(65) Prior Publication Data

US 2020/0115913 A1    Apr. 16, 2020

(51) Int. Cl.
| | | |
|---|---|---|
| *E04G 17/00* | (2006.01) | |
| *F16B 21/02* | (2006.01) | |
| *E04G 17/04* | (2006.01) | |
| *F16B 37/16* | (2006.01) | |

(52) U.S. Cl.
CPC ......... *E04G 17/001* (2013.01); *E04G 17/042* (2013.01); *E04G 17/047* (2013.01); *F16B 21/02* (2013.01); *F16B 37/16* (2013.01)

(58) Field of Classification Search
CPC ....... E04G 11/02; E04G 11/08; E04G 11/085; E04G 11/12; E04G 17/042; E04G 17/047; E04G 17/001; F16B 21/02; F16B 37/16; Y10T 403/46; Y10T 403/4602
See application file for complete search history.

(56) References Cited

U.S. PATENT DOCUMENTS

| | | | |
|---|---|---|---|
| 1,779,908 A | * | 10/1930 | Graziano ............ E04G 17/0658 |
| | | | 249/43 |
| 3,795,393 A | | 3/1974 | Melfi |
| 3,899,152 A | | 8/1975 | Avery |
| 3,945,601 A | | 3/1976 | Rowley |
| 4,033,544 A | | 7/1977 | Johnston |
| 4,144,690 A | | 3/1979 | Avery |
| 4,787,183 A | | 11/1988 | Johnston |
| 4,926,593 A | | 5/1990 | Johnston |
| 4,930,937 A | | 6/1990 | Fulton |
| 4,976,401 A | | 12/1990 | Carlson |
| 5,137,250 A | | 8/1992 | McCracken |

(Continued)

FOREIGN PATENT DOCUMENTS

| | | |
|---|---|---|
| BE | 905030 A | 11/1986 |
| CA | 2110342 A1 | 5/1995 |

(Continued)

OTHER PUBLICATIONS

Translation of JPH05263523 (Year: 1993).*

*Primary Examiner* — Michael Safavi
(74) *Attorney, Agent, or Firm* — Loginov & Associates, PLLC; William A. Loginov

(57) ABSTRACT

A connection assembly for formwork elements includes a counterplate, a bolt, and a bolt block. The counterplate can include a plurality of surfaces having differing heights that selectively engage with a waler during engagement or disengagement of the bolt from the formwork element. The formwork element can include a J-shaped waler that allows for easy climbing and/or hanging of objects on a site. The connection assembly can include a bolt block that removably engages a formwork element.

23 Claims, 4 Drawing Sheets

(56) References Cited

U.S. PATENT DOCUMENTS

| | | | |
|---|---|---|---|
| 5,240,089 A * | 8/1993 | Spera | E04G 7/26 182/186.7 |
| 5,263,296 A * | 11/1993 | Spera | E04G 7/26 182/186.8 |
| 5,644,889 A | 7/1997 | Getz | |
| 5,816,562 A | 10/1998 | Stockton | |
| 5,927,038 A * | 7/1999 | Goldberg | E04B 2/821 403/109.1 |
| 6,223,482 B1 * | 5/2001 | Zohar | E04B 1/3441 135/131 |
| 6,502,802 B2 | 1/2003 | Jorn | |
| 6,581,898 B2 | 6/2003 | McCracken | |
| 6,668,511 B2 | 12/2003 | Xammar | |
| 6,676,102 B1 | 1/2004 | Hambelton | |
| 6,715,729 B2 | 4/2004 | Hambelton | |
| 6,840,490 B2 | 1/2005 | Caluisi | |
| 6,928,782 B2 | 8/2005 | Becker | |
| 7,100,344 B2 | 9/2006 | Schlenker | |
| 7,387,470 B2 | 6/2008 | McCracken | |
| 7,665,259 B2 | 2/2010 | Yoon | |
| 7,744,054 B2 | 6/2010 | Xammar Bove | |
| 7,938,380 B2 | 5/2011 | Becker | |
| 7,963,367 B2 | 6/2011 | Wilson | |
| 8,042,786 B2 | 10/2011 | Spindler | |
| D648,866 S | 11/2011 | D'Anglade | |
| 8,210,492 B2 | 7/2012 | Serrano Rodriguez | |
| 8,651,449 B2 | 2/2014 | Au | |
| 8,857,782 B2 | 10/2014 | Xammar Bove | |
| 9,068,363 B2 | 6/2015 | Rojas Pimiento | |
| 9,611,663 B2 | 4/2017 | Baum | |
| 2002/0066249 A1 | 6/2002 | Xammar | |
| 2002/0158184 A1 | 10/2002 | McCracken | |
| 2002/0189175 A1 | 12/2002 | Lancelot | |
| 2003/0208969 A1 | 11/2003 | Lancelot | |
| 2004/0173405 A1 | 9/2004 | Bove | |
| 2007/0107328 A1 * | 5/2007 | Munch | E06B 9/02 52/202 |
| 2007/0164184 A1 | 7/2007 | Xammar Bove | |
| 2009/0049673 A1 | 2/2009 | Xammar Bove | |
| 2009/0084930 A1 | 4/2009 | Ball | |
| 2012/0286134 A1 * | 11/2012 | Rojas Pimienta | E04G 11/10 249/192 |
| 2014/0008511 A1 | 1/2014 | Xammar Bove | |
| 2015/0218831 A1 | 8/2015 | Berger | |
| 2015/0267421 A1 | 9/2015 | Berger | |
| 2019/0383041 A1 | 12/2019 | McCracken | |

FOREIGN PATENT DOCUMENTS

| | | | | |
|---|---|---|---|---|
| CA | 2141463 A1 | 8/1996 | | |
| CA | 2178031 A1 | 12/1997 | | |
| CA | 2179084 A1 | 12/1997 | | |
| CA | 2206191 A1 | 11/1998 | | |
| CN | 202441052 U | 9/2012 | | |
| CN | 102877643 B | 1/2013 | | |
| CN | 104675108 A | 6/2015 | | |
| CN | 106907002 A | 6/2017 | | |
| CN | 206903213 U | 1/2018 | | |
| DE | 2635565 A1 | 2/1978 | | |
| DE | 4417466 A1 | 10/1995 | | |
| DE | 19758276 A1 | 7/1999 | | |
| DE | 60226139 | 5/2009 | | |
| EP | 0048624 A2 | 3/1982 | | |
| EP | 0049096 B1 | 4/1982 | | |
| EP | 0062420 B1 | 10/1982 | | |
| EP | 0389256 | 9/1990 | | |
| EP | 0869233 | 6/2004 | | |
| EP | 1479852 A1 | 11/2004 | | |
| EP | 1483460 | 12/2004 | | |
| EP | 1818479 | 8/2007 | | |
| EP | 1887163 A2 | 2/2008 | | |
| EP | 1990483 A2 | 11/2008 | | |
| EP | 2712980 A2 | 4/2014 | | |
| EP | 3170952 A1 | 5/2017 | | |
| ES | 457186 | 3/1978 | | |
| ES | 237075 | 12/1978 | | |
| ES | 471247 | 1/1979 | | |
| ES | 1049092 | 11/2001 | | |
| ES | 1049093 | 11/2001 | | |
| ES | 1049094 | 11/2001 | | |
| ES | 1049390 | 12/2001 | | |
| ES | 1049674 | 1/2002 | | |
| ES | 2178604 | 12/2002 | | |
| ES | 1054856 | 9/2003 | | |
| ES | 1055827 | 1/2004 | | |
| ES | 1056678 | 4/2004 | | |
| ES | 2265211 | 2/2007 | | |
| ES | 2274699 | 5/2007 | | |
| ES | 2275374 | 6/2007 | | |
| ES | 2294874 | 4/2008 | | |
| ES | 1105580 | 4/2014 | | |
| ES | 1117930 | 7/2014 | | |
| ES | 2594344 | 12/2016 | | |
| FR | 2780743 A1 | 1/2000 | | |
| GB | 2091332 A | 7/1982 | | |
| GB | 2179697 A | 3/1987 | | |
| GB | 2326208 | 12/1998 | | |
| JP | 2657390 | 11/1989 | | |
| JP | 2657390 B2 | 11/1989 | | |
| JP | 2920308 B2 | 12/1991 | | |
| JP | H03295979 A | 12/1991 | | |
| JP | H05263523 | * 10/1993 | | E04G 17/02 |
| JP | 416411781 | 10/2008 | | |
| KR | 101035423 B1 | 12/2010 | | |
| PH | 22014000755 | 5/2015 | | |
| RU | 15745 U1 | 11/2000 | | |
| WO | 2005042879 | 5/2005 | | |
| WO | 2010074550 A1 | 7/2010 | | |
| WO | 2016030557 A1 | 3/2016 | | |
| WO | 2016139513 A1 | 9/2016 | | |

* cited by examiner

CONNECTION ASSEMBLY FOR FORMWORK

FIELD OF THE INVENTION

The present disclosure relates to connection assemblies for formwork.

BACKGROUND OF THE INVENTION

Certain formwork systems of the prior art use bolts to engage formwork elements with one another. During assembly and disassembly of the formwork system, the bolt may need to be removing or replaced depending on the circumstances. This can be a difficult process or can require the use of additional tools and thus be inconvenient. Such formwork systems may also have a fixed connection assembly that is specific to particular types of bolts. This can be inconvenient where various types of bolts are used on a site, thus requiring specific formwork assemblies to match.

SUMMARY OF THE INVENTION

The present application overcomes the disadvantages of the prior art by providing a connection assembly reduces the difficulty in removing a bolt from a formwork system and provides a removable bolt block assembly for conveniently removing and replacing bolt block assemblies having different parameters without requirement the user of additional specific formwork assemblies.

One or more aspects of the disclosure provide a connection assembly for connecting formwork elements, comprising: a counterplate comprising a plurality of surfaces having differing heights, the counterplate defining a counterplate aperture; a bolt block insert comprising a bolt block plate defining at least one recess; a bolt configured to pass through the counterplate aperture and removably engage with the at least one recess of the bolt block plate.

In one example, the connection assembly further includes a wingnut that engages with a threaded shaft of the bolt.

In one example, the connection assembly further includes a sleeve that surrounds a portion of the threaded shaft of the bolt.

In one example, the plurality of surfaces having differing heights are configured to selectively engage with a front face of a waler of a formwork element.

In one example, the plurality of surfaces having differing heights selectively engage with the front face of the waler based upon rotational position of the counterplate.

In one example, the plurality of surfaces comprise a first surface having a first height and a second surface having a second height greater than the first height.

In one example, the first surface engages with the front face of the waler when the formwork elements are securely engaged with one another.

In one example, the second surface engages with the front face of the waler when the bolt is being removed from the bolt block insert.

In one example, the bolt block insert is removably engagable with at least one of the formwork elements.

In one example, the bolt block insert defines a pinhole for removably receiving a pin.

In one example, the connection assembly further includes a cotter pin that engages with the pin.

One or more aspects of the disclosure provide a formwork system, including: a first formwork element comprising a first waler; a second formwork element comprising a second waler, wherein at least one of the first waler and the second waler comprises a J-shaped profile; and a connection assembly configured to connect the first formwork element and the second formwork element, the connection assembly including: a counterplate comprising a plurality of surfaces having differing heights, the counterplate defining a counterplate aperture; a bolt block insert comprising a bolt block plate defining at least one recess; a bolt configured to pass through the counterplate aperture and removably engage with the at least one recess of the bolt block plate.

In one example, the plurality of surfaces having differing heights are configured to selectively engage with a front face of at least one of the first waler or the second waler.

In one example, the plurality of surfaces having differing heights selectively engage with the front face of the first waler or the second waler based upon rotational position of the counterplate.

In one example, the plurality of surfaces comprise a first surface having a first height and a second surface having a second height greater than the first height.

In one example, the first surface engages with the front face of the first waler or the second waler when the first formwork element and the second formwork element are securely engaged with one another.

In one example, the second surface engages with the front face of the first waler or the second waler when the bolt is being removed from the bolt block insert.

One or more aspects of the disclosure provide a method of disengaging a bolt from a formwork element, including: unthreading a nut with respect to the bolt; rotating a counterplate comprising a plurality of surfaces having differing heights such that at least one of the plurality of surfaces disengages with a waler of the formwork element and another of the plurality of surfaces engages with the waler of the formwork element; and threading the nut with respect to the bolt; and removing the counterplate and the bolt from the formwork element.

In one example, the method further includes disengaging a T-shaped head of the bolt from a bolt block.

In one example, the method further includes removing the bolt block from the formwork element.

BRIEF DESCRIPTION OF THE DRAWINGS

The invention description below refers to the accompanying drawings, of which.

DETAILED DESCRIPTION

Figure 1:
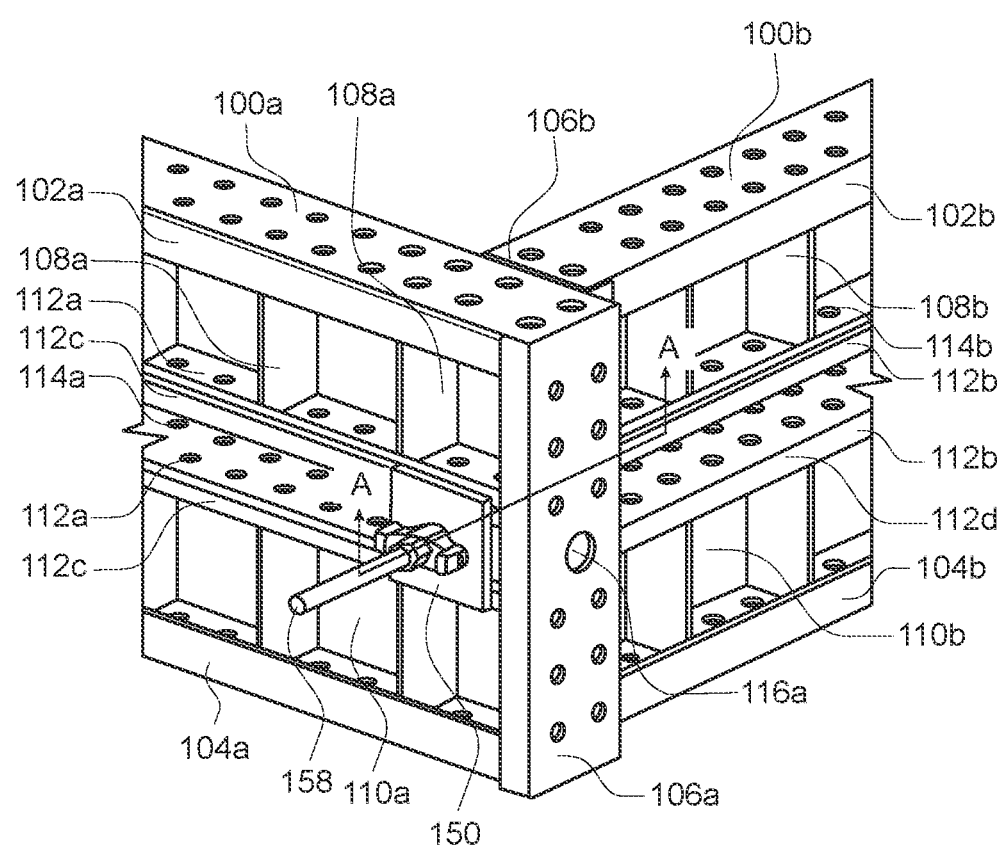
FIG. 1 is a partial perspective view of a plurality of formwork elements connected via a connection assembly according to one or more aspects of the disclosure.

FIG. 1 is a partial perspective view of a plurality of formwork elements 100a, 100b connected via a connection assembly 150 according to one or more aspects of the disclosure.

The formwork element 100a can include a top rail 102a, a bottom rail 104a that opposes and is parallel or substantially parallel to the top rail 102a, a first side rail 106a, and a second side rail (not shown) that opposes and is parallel or substantially parallel to the first side rail 106a. The formwork element 100a can be of any size, shape or dimension in order to achieve the task of forming fresh concrete. For example, the formwork element 100a can be rectangular or substantially rectangular, with the top rail 102a and the bottom rail 104a having equal length and the first side rail 106a and the second side rail (not shown) having equal length.

The top rail 102a, the bottom rail 104a, and the side rail 106a can be formed of any type of metal, such as steel, steel alloy, aluminum, aluminum alloy, or the like. The first side rail 106a of formwork element 100a can define at least one side aperture 116a for engaging with adjacent formwork elements. A second side rail (not shown) of formwork element 100a can also define an identical side aperture (not shown) that is opposed to the side aperture 116a.

The formwork element 100a can be a wall formwork element, a column formwork element, or any other type of formwork element produced by PERI® Formwork Systems, Inc or PERI® GmbH. The formwork element can be formed of any type of material, including metals such as steel, steel alloy, aluminum, aluminum alloy or the like. In one example, the formwork element can have withstand a fresh concrete pressure of up to approximately 60 kN/m$^2$.

The formwork element 100a can include one or more stiffeners 108a connected to a steel face 110a. The one or more stiffeners 108a can be welded directly or indirectly to the steel face 110a and can extend perpendicularly or substantially perpendicularly from a surface of the steel face 110a. The stiffeners 108a on the steel face 110a can both be made of any type of metal, such as steel, steel alloy, aluminum, aluminum alloy, or the like. The formwork element 110a can also include a pair of walers 112a. The walers can be formed of any type of metal such as aluminum, aluminum alloy, steel, steel alloy, or the like. The walers 112b can be an integrally-formed piece or can comprise a plurality of segments that are welded together to ultimately form the J-shaped profile. The walers can extend perpendicularly or substantially perpendicularly from the surface of the steel face 110a and can be welded directly or indirectly to the steel face 110a.

Figure 4:
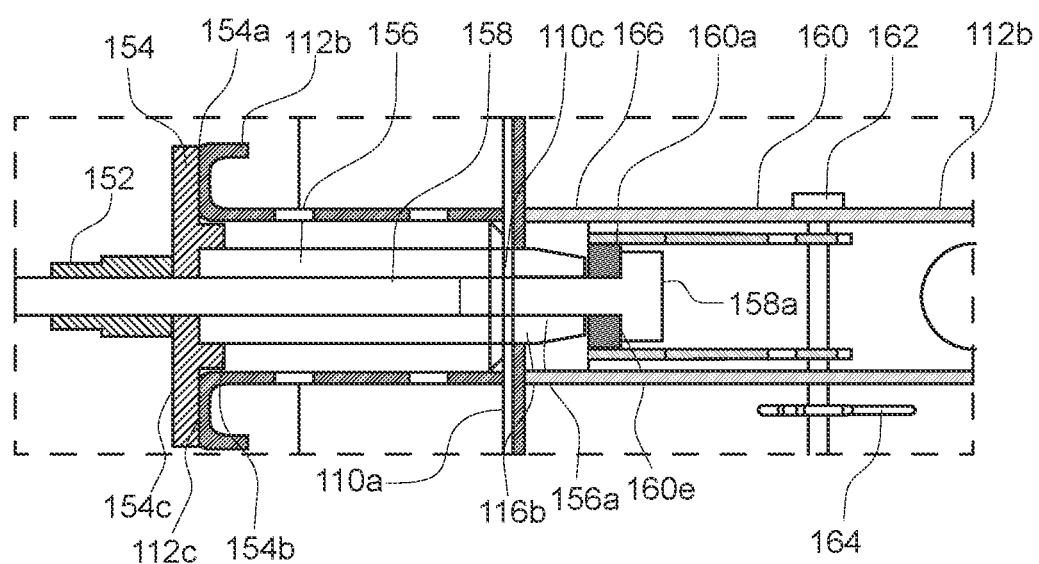
FIG. 4 is a partial cross-sectional view along A-A of the formwork elements of FIG. 1 with the connection assembly according to one or more aspects of the disclosure.

The walers 112a can have a J-shaped profile (as shown in FIG. 4) with the "hook" of the J-shape curving away from an opposed waler 112b. This shape allows for a worker to more easily establish a foothold within the formwork element 100a when the worker is climbing a series of formwork elements on a construction site. Further, the J-shaped profile allows for objects to be hung from the walers, such as walk access bracket(s), ladder(s), guy and brace connector(s), hold down bracket(s), strut connection(s), and other accessories. The J-shaped profile of the walers 112a allows for a planar (or substantially planar) portion defined at least in part by front face 112c. This shape defines an interior space between the walers 112a defined at least in part by the walers 112a, the steel face 110a, and a plane that is coplanar with the front faces 112c of the respective walers 112a.

The walers 112a can also define a plurality of waler apertures 114a that can be used during connection of formwork elements 100a, b in conjunction with the connection assembly 150, as will be described in greater detail below. While the walers 112a are depicted with a J-shaped profile, it is contemplated that the walers can also have an L-shaped profile that provides a similar front face 112c.

The formwork element 100b that is connected with formwork element 100a can be the same type of formwork element as formwork element 100a and can have a top rail 102b, a bottom rail 104b, a first side rail 106b, a second side rail (not shown), steel face 110b, walers 112b, front faces 112d, waler apertures 114b, and one or more side apertures 116b (shown in FIG. 4).

Figure 2A:
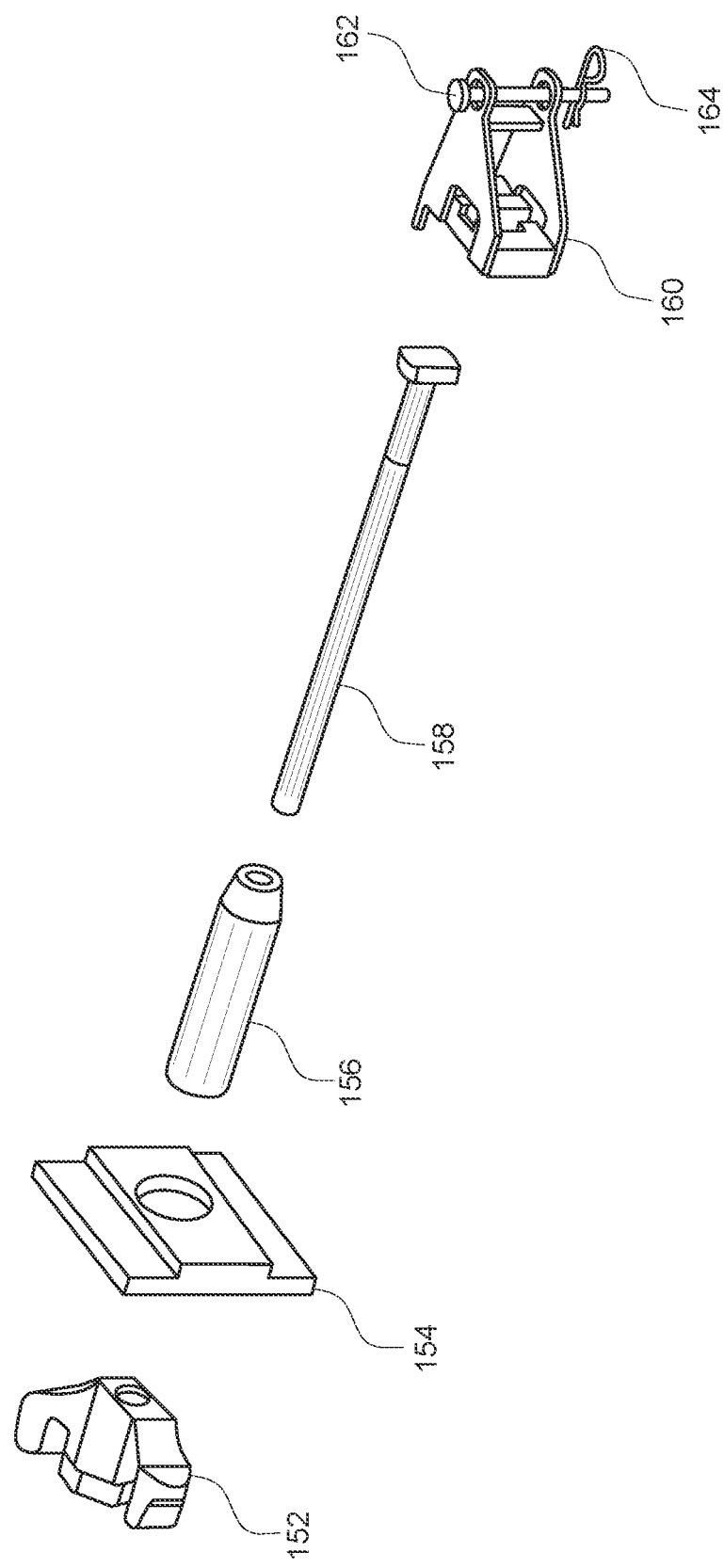
FIG. 2A is an exploded view of components of the connection assembly.
Figure 2B:
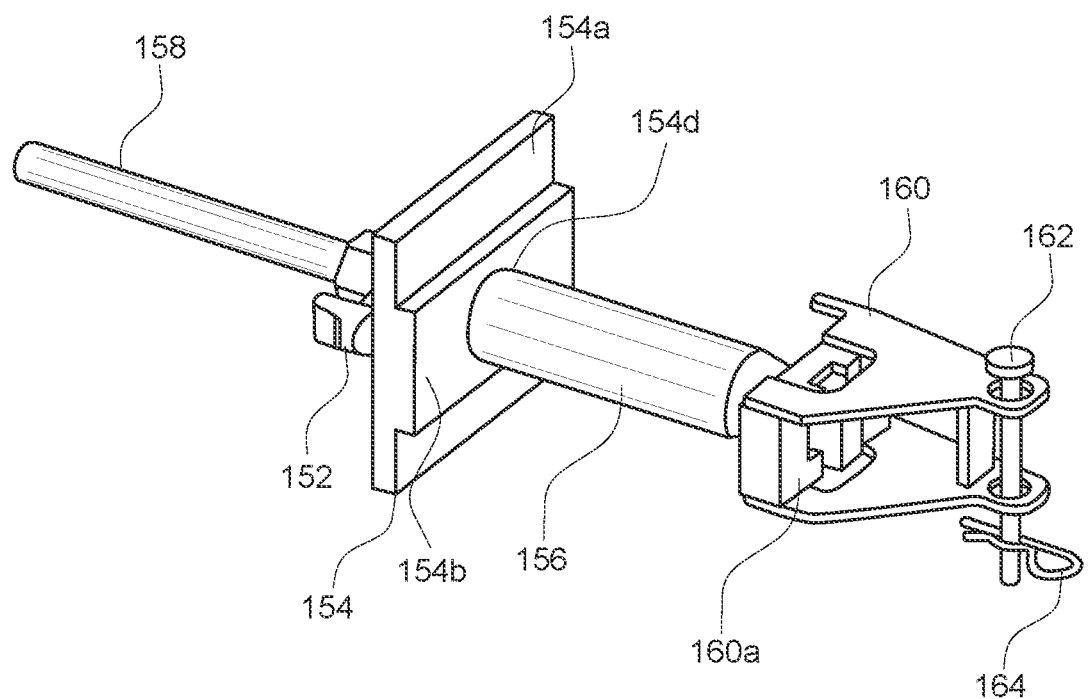
FIG. 2B is a perspective view of components of the connection assembly according to one or more aspects of the disclosure.

FIG. 2A is an exploded view of components of the connection assembly 150 and FIG. 2B is a perspective view of components of the connection assembly 150 according to one or more aspects of the disclosure.

The connection assembly 150 can include a wingnut 152, a counterplate 154, a sleeve 156, a bolt 158 (e.g., T-bolt), and a bolt block insert 160. The wingnut 152 can be any type of wingnut capable of engaging a threaded bolt 158, such as a T-Bolt with a DW20 Euro Thread. In other examples, the wingnut can comprises any type of nut that can be threaded and unthreaded either by hand or using a tool.

The counterplate 154 can be made of any material, including a metal such as aluminum, aluminum alloy, steel, steel alloy, or the like. The counterplate 154 has a first surface 154a (e.g., lower surface 154a) and a second surface 154b (e.g., raised surface 154b), with the raised surface 154b having a greater height with respect to front face 154c relative to the first (lower) surface 154a and the counterplate 154 having a greater thickness in the region of the raised surface 154b relative to the first surface 154a.

The front face 154c of the counterplate 154 can have a substantially planar profile, defining a counterplate aperture 154d in the center thereof for receiving the sleeve 156. The raised surface 154b can have a substantially rectangular profile, also defining the counterplate aperture 154d in the center thereof. The first surfaces 154a can have planar profiles.

The counterplate aperture 154d can define a plurality of inner diameters, with the raised surface having a larger diameter than a diameter corresponding to the first surface. This provides a stop from the sleeve advancing completely and freely through the aperture 154d.

As shown in FIG. 2B, the wingnut 152 engages with the threading of the bolt 158 and is tightened snugly against a front face 154c of the counterplate 154. In this configuration, the bolt 158 passes through the sleeve 156 and through the counterplate 154 and engages with the bolt block plate 160a. The sleeve 156 engages with the counterplate aperture 154d.

Figure 3:
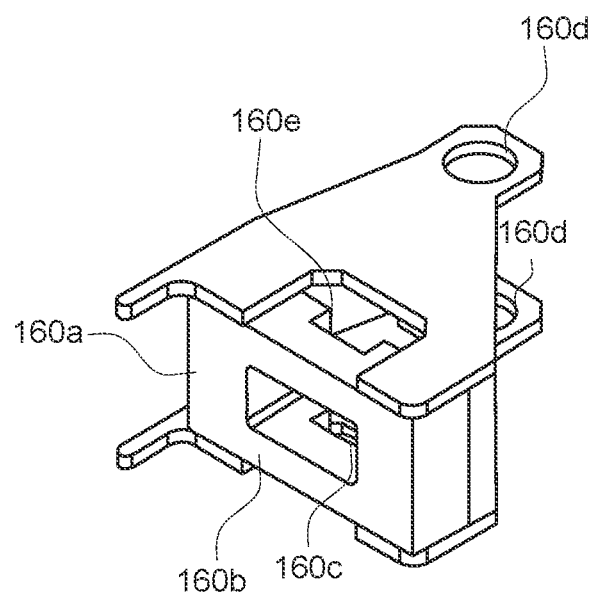
FIG. 3 is a view of a bolt block insert according to one or more aspects of the disclosure.

FIG. 3 is a view of a bolt block insert according to one or more aspects of the disclosure.

The bolt block 160 (and any components thereof) can be made of any material, including a metal such as aluminum, aluminum alloy, steel, steel alloy, or the like. The bolt block insert 160 can include a bolt block plate 160a that defines a rectangular or substantially rectangular slot 160b. In this regard, the substantially rectangular slot can include rounded or chamfered edges. The slot 160b can the T-shaped head 158a of the bolt 158. The bolt block insert 160 can also define a pair of pinholes 160d for receiving the pin 162. The cotter pin 164 can securely engage with the pin 162 and allow for engagement and disengagement with waler apertures 114a, b of the walers (e.g., walers 112a, 112b) of a formwork element 100a,b.

As shown in FIG. 3, the bolt block plate 160a defines at least one recess 160c (e.g., a pair of recesses 160c) for receiving the T-shaped head 158a of the bolt 158 once the T-shaped head passes through the slot 160b. In this regard, the recesses 160c can have a rectangular or substantially rectangular two-dimensional profile. In this regard, the substantially rectangular profile can include rounded or chamfered edges. The bolt block plate 160a can also include a planar or substantially planar face 160e. The face 160e can be substantially planar and while being partially defined by the slot 160b and the recesses 160c.

FIG. 4 is a partial cross-sectional view along A-A of the formwork elements 100a, 100b of FIG. 1 with the connection assembly 150 according to one or more aspects of the disclosure.

Connection and disconnection of the formwork elements 100a, b via attachment and disengagement of the connection assembly 150 will described below with reference to FIG. 4. While the attachment and disengagement are described below in a series of steps or processes, it should be understood that the steps need not necessarily be performed in the order presented below. That is to say, the order of steps can be modified, steps can be added, or steps can be omitted according to various implementations contemplated by the present application.

A user can place formwork elements 100a and 100b adjacent to one another such that the steel face 110a of formwork element 100a is adjacent to side rail 106b of formwork element 100b. In this arrangement, an aperture 110c defined by steel face 110a is in alignment with the side aperture 116b of the side rail 106b. The bolt block insert 160 can be inserted in a space between the walers 112b of formwork element 100b. A pin 162 can be inserted into the pinholes 160d of bolt block insert 160 and threaded through a waler aperture 114a, b, and a cotter pin 164 can be engaged with the pin 162 to allow for removable engagement of the bolt block insert 160 with the walers 112b of the formwork element 100b. During engagement of the bolt block insert 160, a bearing 166 can be inserted in a pressure fit relationship between the bolt block insert 160 (and in particular bolt block plate 160a) and the side rail 106b.

The bolt 158 can be inserted into and through the sleeve 156 and both can be inserted through the steel face 110a aperture 110c and the side aperture 116b until the reduced diameter portion 156a of sleeve 156 engages with a corresponding reduced diameter portion of bearing 166 and the T-shaped head 158a of the bolt 158 passes through the slot 160b defined by the bolt block plate 160a. The reduced diameter portion 156a can be a linearly reducing diameter or can be curved or can be curvilinear in profile. The bolt 158 can be rotated so that the T-shaped head engages with the recesses 160c rather than the planar face 160e.

The counterplate 154 can then be advanced along the shaft of the bolt 158 such that the raised surface 154b is disposed between the walers 112b and the first surfaces 154a are flush against the front faces 112c. The wingnut 152 can then be threaded onto the shaft of the bolt 158 toward the counterplate 154 until it advances to the front face 154c of the counter plate 154. With the wingnut 152 snug against the front face 154c of the counterplate 154 and the T-shaped head 158a of the bolt secured firmly in the recesses 160c, the formwork elements 100a, b are securely engaged with one another.

To remove the bolt 158, a user can first unthread the wingnut 152 along the thread of bolt 158 and away from the front face 154c of the counter plate 154. The wingnut can be unthreaded enough to allow the counterplate 154 to be advanced away from the walers 112 and allow the counterplate 154, and in particular the raised surface 154b, to rotate freely without interference from the walers 112b. In this position, the raised surfaces 154b are no longer disposed between the walers 112b. The counterplate 154 is then rotated such that the raised surfaces 154b engage with respective front faces 112c of the j-shaped walers 112b. This can be accomplished by rotating the counterplate 154 90°, 270°, or any rotational multiple thereof. In this way, the unthreading of the wingnut 152 allows for the bolt 158 to be rotated by 90 degrees, 270 degrees, or rotational multiples thereof to allow for the T-shaped head 158a to be advanced further into the slot 160b, rotated, and subsequently disengaged from the recesses 160c. In this alignment, the T-shaped head 158a of the bolt 158 can move freely in and/or out of the slot 160b.

Once aligned, the wingnut 152 can be retightened to be snug against the front face 154c of the counterplate 154. Once retightened, the bolt 158, wingnut 152, counterplate 154 and sleeve 156 can be removed from the bolt block insert 160 and the formwork elements 110a,b. In this regard, the elements 152, 154, 156, and 158 can be removed simultaneously as a singled unit. This advantageously provides additional leverage for the user and allows easier removal. Once removed, the formwork elements 100a, b can be disengaged from one another.

The bolt block insert 160 can also be removed from the formwork element 110b by removing the cotter pin 164, removing the pin 162 from the pinholes 160d of bolt block insert 160 and the waler aperture 114a,b, and removing the bolt block insert 160 and optionally the bearing 166 from the space between the walers 112b. In this regard, the bolt block insert 160 is removable and replaceable in either of the formwork elements 100a 100b, which allows for greater flexibility of use of the formwork element on a construction site. For example, a bolt block insert can be removed from a formwork element 100b and replaced with a bolt block insert of different specifications as required by the particular task on-site without the need to acquire an entire new formwork element.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. Accordingly, this description is meant to be taken only by way of example, and not to otherwise limit the scope of this invention.

What is claimed is:

1. A connection assembly for connecting formwork elements, comprising:
    a counterplate comprising a plurality of surfaces having differing heights, the counterplate defining a counterplate aperture;
    a bolt block insert comprising a bolt block plate defining at least one recess, the bolt block insert being removably engagable with at least one of the formwork elements, the bolt block insert defining a pinhole for removably receiving a pin;
    a bolt configured to pass through the counterplate aperture and removably engage with the at least one recess of the bolt block plate; and
    a cotter pin that engages with the pin.

2. A formwork system, comprising:
    a first formwork element comprising a first waler;
    a second formwork element comprising a second waler, wherein at least one of the first waler and the second waler comprises a J-shaped profile; and a connection assembly configured to connect the first formwork element and the second formwork element, the connection assembly comprising:
- a counterplate comprising a plurality of surfaces having differing heights, the counterplate defining a counterplate aperture;
- a bolt block insert comprising a bolt block plate defining at least one recess;
- a bolt configured to pass through the counterplate aperture and removably engage with the at least one recess of the bolt block plate.

3. The formwork system of claim 2, wherein the plurality of surfaces having differing heights are configured to selectively engage with a front face of at least one of the first waler or the second waler.

4. The formwork system of claim 3, wherein the plurality of surfaces having differing heights selectively engage with the front face of the first waler or the second waler based upon rotational position of the counterplate.

5. The formwork system of claim 4, wherein the plurality of surfaces comprise a first surface having a first height and a second surface having a second height greater than the first height.

6. The formwork system of claim 5, wherein the first surface engages with the front face of the first waler or the second waler when the first formwork element and the second formwork element are securely engaged with one another.

7. The formwork system of claim 6, wherein the second surface engages with the front face of the first waler or the second waler when the bolt is being removed from the bolt block insert.

8. A connection assembly for connecting formwork elements, comprising:
- a counterplate comprising a plurality of surfaces having differing heights, the counterplate defining a counterplate aperture;
- a bolt block insert comprising a bolt block plate defining at least one recess;
- a bolt configured to pass through the counterplate aperture and removably engage with the at least one recess of the bolt block plate;
- a wingnut that engages with a threaded shaft of the bolt; and
- a sleeve that surrounds a portion of the threaded shaft of the bolt.

9. The connection assembly of claim 8, wherein the plurality of surfaces comprise a first surface and a second surface that are configured to selectively engage with a front face of a waler of a formwork element.

10. The connection assembly of claim 9, wherein the first surface and the second surface selectively engage with the front face of the waler based upon rotational position of the counterplate.

11. The connection assembly of claim 10, wherein the first surface engages with the front face of the waler when the formwork elements are securely engaged with one another.

12. The connection assembly of claim 11, wherein the second surface engages with the front face of the waler when the bolt is being removed from the bolt block insert.

13. The connection assembly of claim 8, wherein the bolt block insert is removably engagable with at least one of the formwork elements.

14. The connection assembly of claim 13, wherein the bolt block insert defines a pinhole for removably receiving a pin.

15. The connection assembly of claim 14, further comprising a cotter pin that engages with the pin.

16. A connection assembly for connecting formwork elements, comprising:
- a counterplate comprising a plurality of surfaces having differing heights, the counterplate defining a counterplate aperture;
- a bolt block insert comprising a bolt block plate defining at least one recess, the bolt block insert being removably engagable with at least one of the formwork elements, the bolt block insert defining a pinhole for removably receiving a pin; and
- a bolt configured to pass through the counterplate aperture and removably engage with the at least one recess of the bolt block plate.

17. The connection assembly of claim 16, wherein the plurality of surfaces comprise a first surface and a second surface that are configured to selectively engage with a front face of a waler of a formwork element.

18. The connection assembly of claim 17, wherein the first surface and the second surface selectively engage with the front face of the waler based upon rotational position of the counterplate.

19. The connection assembly of claim 18, wherein the first surface engages with the front face of the waler when the formwork elements are securely engaged with one another.

20. The connection assembly of claim 19, wherein the second surface engages with the front face of the waler when the bolt is being removed from the bolt block insert.

21. A method of disengaging a bolt from a formwork element, comprising:
- unthreading a nut with respect to the bolt;
- rotating a counterplate comprising a plurality of surfaces having differing heights such that at least one of the plurality of surfaces disengages with a waler of the formwork element and another of the plurality of surfaces engages with the waler of the formwork element;
- threading the nut with respect to the bolt; and
- removing the counterplate and the bolt from the formwork element.

22. The method of claim 21, further comprising disengaging a T-shaped head of the bolt from a bolt block.

23. The method of claim 22, further comprising removing the bolt block from the formwork element.

\* \* \* \* \*